United States Patent [19]

Sugiyama et al.

[11] Patent Number: 5,535,272
[45] Date of Patent: Jul. 9, 1996

[54] SENSOR CIRCUIT FOR A TELEPHONE LINE

[75] Inventors: Masaaki Sugiyama; Hiroyuki Ohta, both of Nagaokakyo, Japan

[73] Assignee: Murata Manufacturing Co., Ltd., Japan

[21] Appl. No.: 496,222

[22] Filed: Jun. 28, 1995

Related U.S. Application Data

[63] Continuation of Ser. No. 319,095, Oct. 6, 1994, abandoned, which is a continuation of Ser. No. 183,567, Jan. 19, 1994, abandoned, which is a continuation of Ser. No. 68,590, May 27, 1993, abandoned, which is a continuation of Ser. No. 907,340, Jul. 1, 1992, abandoned.

[30] Foreign Application Priority Data

Jul. 1, 1991 [JP] Japan ................. 3-050552 U

[51] Int. Cl.$^6$ .................................................. H04M 3/22
[52] U.S. Cl. ........................... 379/373; 379/377; 379/378
[58] Field of Search .................................. 379/373, 374, 379/375, 376, 377, 378

[56] References Cited

U.S. PATENT DOCUMENTS

| | | | |
|---|---|---|---|
| 4,022,980 | 5/1977 | Kitajewski et al. | 379/378 |
| 4,191,859 | 3/1980 | Sabon | 379/378 |
| 4,570,034 | 2/1986 | Serrano | 379/373 |
| 4,920,561 | 4/1990 | Mitchell | 379/373 |

*Primary Examiner*—Jeffery Hofsass
*Assistant Examiner*—Scott Wolinsky
*Attorney, Agent, or Firm*—Ostrolenk, Faber, Gerb & Soffen

[57] ABSTRACT

A sensor circuit for telephone line (10) includes a detection coil (12a) inserted in a telephone line (14). The coil generates a magnetic flux according to a line current which flows in the telephone line. A magnetic sensor (12b) such as a Hall element generates a voltage signal in response to the magnetic flux. An output of the magnetic sensor is amplified by an amplifier (16). A calling signal detection circuit (18) which receives an output of the amplifier includes a capacitor (20) for cutting-off a direct current component included in the amplified output. An alternating current component is inputted to a (−) input of a hysteresis comparing circuit (22) which receives a reference voltage (Vref1) at a (+) input thereof. Therefore, the alternating current component is converted into a pulse signal which is then withdrawn at an output terminal (34) as a calling signal for ringing a bell of a telephone set. In addition, a line current supervisor circuit (36) is connected to the output of the amplifier so as to detect the line current by utilizing reference voltages (Vref2, Vref3).

4 Claims, 3 Drawing Sheets

F I G. 2
(A) 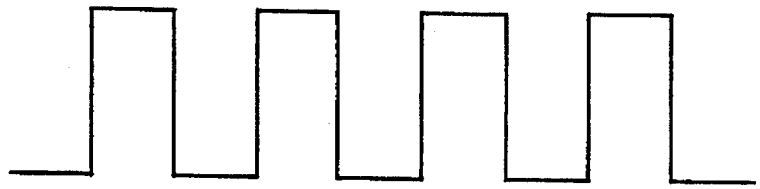
(B) 
(C) 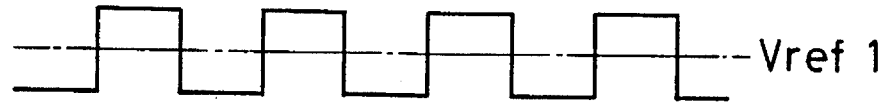
Vref 1
(D) 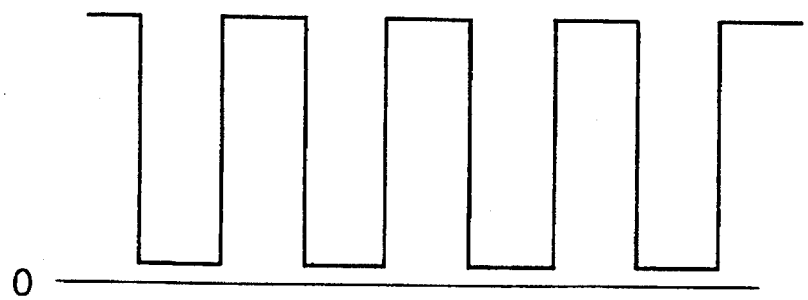

SENSOR CIRCUIT FOR A TELEPHONE LINE

This is a continuation of application Ser. No. 08/319,095 filed on Oct. 6, 1994, now abandoned, which is a continuation of application Ser. No. 08/183,567 filed on Jan. 19, 1994, now abandoned, which is a continuation of application Ser. No. 08/068,590 filed on May 27, 1993, now abandoned, which is a continuation of application Ser. No. 07/907,340 filed on Jul. 1, 1992, now abandoned.

BACKGROUND OF THE INVENTION

1. Field of the Invention

The present invention relates to a sensor circuit for a telephone line. More specifically, the present invention relates to a sensor circuit for a telephone line which is provided in a network control unit (NCU).

2. Description of the Prior Art

In order to ring a bell of a telephone in response to a reception of a calling signal of 12–80 Hz, for example in an ON state of a hook switch, an NCU is provided with a calling signal detection circuit. In addition, for detecting an ON/OFF state of the hook switch of the telephone, and etc., the NCU is further provided with a line current supervisor circuit.

In such a calling signal detection circuit and the line current supervisor circuit, as well-known, it is necessary to isolate the circuits from the telephone line. Therefore, in a conventional sensor circuit, by using a photocoupler as a main component, it was intended to ensure the insulation.

For example, as a calling signal detection circuit, there was a circuit in which a full-wave rectifying circuit is connected to the telephone line and a photocoupler is connected to an output of the full-wave rectifying circuit. In addition, as a line current supervisor circuit, there was a circuit in which a pair of photocouplers are inserted in the telephone line such that outputs according to a flowing direction of the line current can be obtained from the photocouplers.

In such a case, because respective circuits are constructed separately from each other, a component for insulation such as a photocoupler is required for each circuit, and therefore, the number of components was large, and thus, assembling of the circuits was troublesome.

SUMMARY OF THE INVENTION

Therefore, a principal object of the present invention is to provide a novel sensor circuit for a telephone line.

Another object of the present invention is to provide a sensor circuit for a telephone line which requires less number of components.

In brief, a sensor circuit for a telephone line according to the present invention comprises: magnetically sensing means coupled to a telephone line for magnetically sensing an electric signal which flows in the telephone line; amplifying means coupled to the magnetically sensing means for amplifying a detection output from the magnetically sensing means; calling signal detecting means for detecting a calling signal component included in an amplified signal, the calling signal detection means including a capacitor for cutting-off a direct current component included in the amplified signal and pulse signal generating means for generating a pulse signal on the basis of an alternating current component included in the amplified signal; and line current supervisor means for detecting a line current component included in the amplified signal.

The magnetically sensing means includes, for example, a detection coil inserted in the telephone line and a magnetic sensor such as a Hall element magnetically coupled to the detection coil. Therefore, the magnetically sensing means outputs a detection signal according to the electric signal which flows in the telephone line. The detection signal outputted from the amplifying means is applied to the calling signal detecting means and the line current supervisor means, respectively. The calling signal detecting means includes the capacitor for cutting-off a direct current component of the amplified signal and a hysteresis comparator, for example, as the pulse signal generating means. The line current supervisor means includes, for example, two comparators which compare the amplified signal with the reference voltages different from each other, respectively so as to detect a line current component included in the amplified signal. Therefore, the calling signal detecting means detects the calling signal in an ON state of a hook switch, and the line current supervisor means detects the line current in an OFF state of the hook switch.

According to the present invention, only a single magnetic sensor may be commonly utilized as a component for ensuring to insulate the calling signal detection circuit and the line current supervisor circuit from the telephone line, and therefore, it is possible to reduce the number of insulating components utilized in an NCU, and accordingly, it is possible to obtain the NCU with a small space and a low cost.

BRIEF DESCRIPTION OF THE DRAWINGS

FIG. 2 is a waveform chart showing an operation of a calling signal detection circuit shown in FIG. 1.

DETAILED DESCRIPTION OF THE PREFERRED EMBODIMENTS

Figure 1:
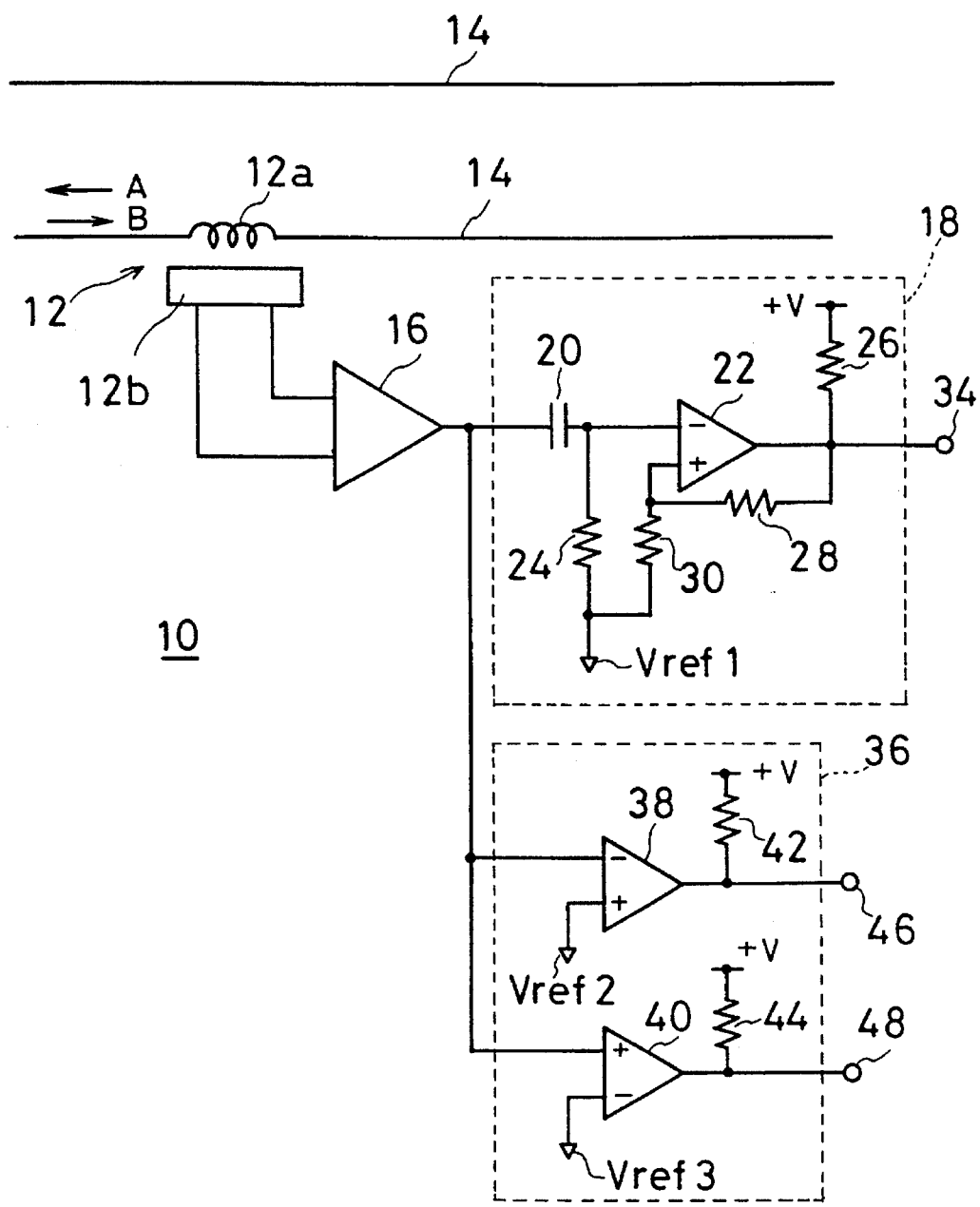
FIG. 1 is a circuit diagram showing one embodiment according to the present invention.

With reference to FIG. 1, a sensor circuit for a telephone line 10 of this embodiment according to the present invention includes a detection coil 12a and a magnetic sensor 12b such as a Hall element which is magnetically coupled to the detection coil 12a. The detection coil 12a and the magnetic sensor constitutes a magnetically detecting means for magnetically detecting an electric signal which flows in a pair of telephone lines 14. The detection coil 12a is inserted in one of the pair of telephone lines 14, and generates a magnetic flux according to the above described electric signal such as a calling signal of 12–80 Hz, for example, a line current, and etc. The magnetic flux sensed by the magnetic sensor 12b generates a voltage signal according to the magnetic flux.

The voltage signal, that is, a detection signal is amplified by an amplifier 16 which has an output commonly connected to an input of a calling signal detection circuit 18 and an input of a line current supervisor circuit 36.

The calling signal detection circuit 18 includes a hysteresis comparator 22 which has a (−) input connected to the input of the circuit 18 via capacitor 20 which is a capacitor for cutting-off a direct current component included in an amplified signal, that is, the voltage signal. To the (−) input of the comparator 22, a reference voltage Vref1 is further applied via a resistor 24. An output of the comparator 22 is pulled-up by a resistor 26 to a power source voltage +V, and the output of the comparator 22 is connected to the reference voltage Vref1 through a series connection of resistors 28 and 30. In addition, the resistor 26 may be omitted if the comparator 22 is constituted by an operational amplifier. A series connection point of the resistors 28 and 30 is connected to a (+) input of the comparator 22. Therefore, the (+) input of the comparator 22 receives a voltage obtained by voltage-dividing a voltage difference between a voltage at the output of the comparator 22 and the reference voltage Vref1, whereby a hysteresis characteristic is applied to the comparator 22.

In one example, a value of the reference voltage Vref1 is set as 2.5 V, and a value of the output voltage of the comparator 22 is 5.0 V in a state where the output is a high level, and resistance values of the resistors 28 and 30 are 90 kΩ and 10 kΩ, respectively, for example. When the output of the comparator 22 is the high level, a voltage at the (+) input of the comparator 22 becomes 2.75 V (=(5.0−2.5)× (10/100)+2.5), and therefore, the comparator 22 outputs a low level signal only when the (−) input of the comparator 22 becomes larger than the 2.75 V. Then, in a state where the low level is outputted from the comparator 22, the voltage at the output of the comparator 22 becomes approximately 0 V. Therefore, the voltage at the (+) input of the comparator 22 becomes 2.25 V (=(0−2.5)×(10/100)+2.5), and accordingly, the comparator 22 does not output a high level signal until the voltage at the (−) input becomes smaller than the 2.25 V. Thus, the comparator 22 has a hysteresis characteristic. In addition, the output of the comparator 22 is withdrawn at a terminal 34 as a calling signal detection signal.

The line current supervisor circuit 36 includes two comparators 38 and 40 as shown in FIG. 1. The comparator 38 receives the voltage signal outputted from the amplifier 16 at a (−) input and a reference voltage Vref2 at a (+) input. The comparator 40 receives the same voltage signal at a (+) input and a reference voltage Vref3 at a (−) input. In addition, outputs of the comparators 38 and 40 are pulled-up to the power source voltage by resistors 42 and 44, respectively. In addition, the outputs of the comparators 38 and 40 are withdrawn at terminals 46 and 48, respectively, as a line current supervisory signal.

Meanwhile, if the comparators are constructed by operational amplifiers, the pull-up resistor 42 and 44 may be omitted.

In an ON hook state where a hook switch (not shown) is turned-on, if a calling signal is transmitted to the telephone lines 14, an electric signal as shown in FIG. 2(A) is represented on the telephone line 14, and thus, the amplifier 16 outputs the amplified voltage signal as shown in FIG. 2(B). The direct current component is cut-off by the capacitor 20, and then, only the alternating current component is applied to the (−) input of the comparator 22, and therefore, a voltage signal as shown in FIG. 2(C) is received by the (−) input of the comparator 22. The voltage signal is level-detected by the hysteresis comparator 22 having the hysteresis characteristic described above. Therefore, a calling signal detection signal as shown in FIG. 2(D) is outputted from the comparator 22, i.e. the terminal 34. The calling signal detection signal is applied to a tone ringer circuit (not shown) to ring a bell of the telephone set.

In addition, in the above described circuit configuration, a threshold level of the comparator 22 is set at a succeeding stage of the capacitor 20, and therefore, if a noise component is included in the voltage signal from the amplifier 16, no detection signal due to the noise is erroneously outputted.

Figure 3:
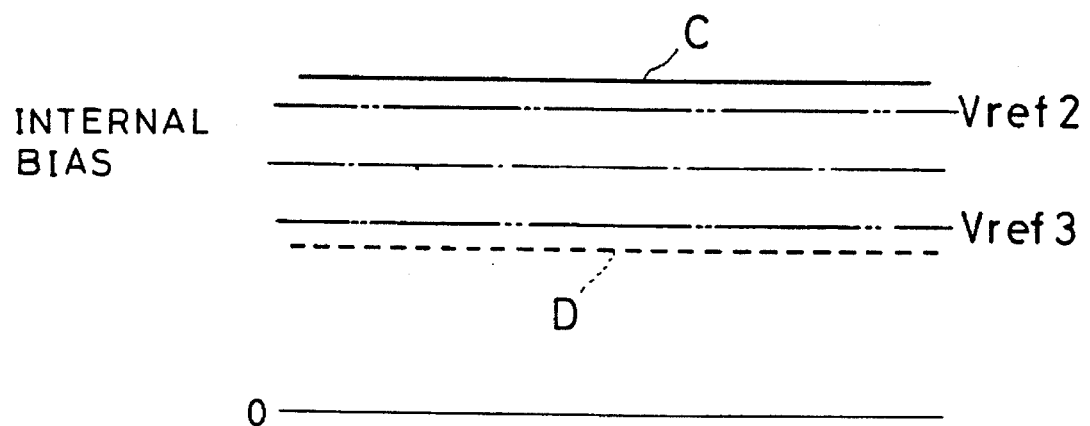
FIG. 3 is a waveform chart showing a voltage signal outputted from an amplifier shown in FIG. 1.

In a OFF hook state where the hook switch is turned-off by releasing a handset (not shown), a line current flows in the telephone line 14. Therefore, the detection coil 12a generates a magnetic signal (magnetic flux) according to a flowing direction of the line current. The magnetic sensor 12b detects the magnetic signal generated by the detection coil 12a and outputs a voltage signal, and therefore, the amplifier 16 amplifies the voltage signal and outputs an amplified voltage signal as shown in FIG. 3. In FIG. 3, a solid line C shows the voltage signal from the amplifier 16 at a time when the line current flows in the telephone line 14 in a direction of one of the arrow marks A and B, and a dotted line D shows the voltage signal at a time when the line current flows in a direction of the other of the arrow marks A and B. Therefore, the voltage signal shown by the solid line C in FIG. 3 is compared with the reference voltage Vref2 which is also shown in FIG. 3 by a two-dotted line by the comparator 38, and the comparator 38 outputs a low level signal when the voltage signal is larger than the reference voltage Vref2. On the other hand, the voltage signal shown by the dotted line D in FIG. 3 is compared with the reference voltage Vref3 which is also shown in FIG. 3 by a two-dotted line by the comparator 40, and if the voltage signal is smaller than the reference signal Vref3, a low level signal is outputted from the comparator 40. Thus, the low level signal is outputted from the comparator 38 when the line current of a predetermined magnitude flows in the arrow mark A or B direction, and the low level signal is outputted from the comparator 40 when the line current of a predetermined magnitude flows in the arrow mark B or A direction.

In addition, when the line current does not flow in the telephone line 14 or a magnitude of the line current is small and thus the voltage signal is smaller than the reference voltage Vref2, a high level signal is outputted from the comparator 38. If the voltage signal is larger than the reference voltage Vref3, high level signals are outputted from the comparators 38 and 40.

These line current supervisor signal is applied to, for example, a microcomputer (not shown) for notifying a state of the line current.

In addition, only the amplifier 16 is provided in the above described embodiment; however, two amplifiers may be provided so as to commonly receive the output of the magnetic sensor 12b and respectively apply the voltage signals to the calling signal detecting circuit 18 and the line current supervisor circuit 36.

Although the present invention has been described and illustrated in detail, it is clearly understood that the same is by way of illustration and example only and is not to be taken by way of limitation, the spirit and scope of the present invention being limited only by the terms of the appended claims.

What is claimed is

1. A sensor circuit for a telephone line, comprising:
magnetically sensing means coupled to a telephone line for magnetically sensing an electric signal which flows in said telephone line, said magnetically sensing means including magnetic signal generating means for generating a magnetic signal according to said electronic signal, and magnetic signal detecting means isolated from said magnetic signal generating means for detecting said magnetic signal generated by said magnetic signal generating means to output a detection signal;

amplifying means coupled to said magnetic signal generating means for amplifying said detection signal from said magnetic signal generating means;

calling signal detecting means for detecting a calling signal component included in said amplified detection signal, said calling signal detection means including a capacitor for cutting-off a direct current component included in the amplified signal and pulse signal generating means for generating a pulse signal on the basis of an alternating current component included in said amplified signal; and line current supervisor means for detecting a line current component included in said amplified signal.

2. A sensor circuit according to claim 1, wherein said pulse signal generating means includes a comparator having a hysteresis characteristic.

3. A sensor circuit according to claim 1, wherein said magnetic signal generating means includes a detection coil means inserted in said telephone line.

4. A sensor circuit according to claim 3, wherein said magnetic signal detecting means includes a Hall element.

* * * * *